United States Patent [19]

Noji et al.

[11] Patent Number: 4,987,710
[45] Date of Patent: * Jan. 29, 1991

[54] DAMPING DEVICE IN A STRUCTURE AND DAMPING CONSTRUCTION AND DAMPING METHOD USING THOSE DEVICES

[75] Inventors: Toshiyuki Noji, Chiba; Hidetoshi Yoshida, Tokyo; Eiji Tatsumi, Chiba, all of Japan

[73] Assignee: Mitsui Kensetsu Kabushiki Kaisha, Tokyo, Japan

[*] Notice: The portion of the term of this patent subsequent to Sep. 4, 2007 has been disclaimed.

[21] Appl. No.: 439,938

[22] Filed: Nov. 21, 1989

Related U.S. Application Data

[62] Division of Ser. No. 216,496, Jul. 8, 1988.

[30] Foreign Application Priority Data

Dec. 1, 1987 [JP] Japan ................................. 62-305379
Dec. 24, 1987 [JP] Japan ................................. 62-327650
Mar. 22, 1988 [JP] Japan ................................. 63-67950

[51] Int. Cl.$^5$ .............................................. E02D 27/34
[52] U.S. Cl. ................................................ 52/167 DF
[58] Field of Search ................................... 52/167 DF

[56] References Cited

U.S. PATENT DOCUMENTS

| 4,226,554 | 10/1980 | Vandiver | 52/167 DF |
| 4,783,937 | 11/1988 | Sato | 52/167 DF |

FOREIGN PATENT DOCUMENTS

| 962502 | 9/1982 | U.S.S.R. | 52/167 DF |
| 999421 | 7/1965 | United Kingdom | 52/167 DF |
| 1322807 | 7/1973 | United Kingdom | 52/167 DF |
| 2212531 | 7/1989 | United Kingdom | 52/167 DF |
| 2212592 | 7/1989 | United Kingdom | 52/167 DF |

Primary Examiner—Henry E. Raduazo
Attorney, Agent, or Firm—Wenderoth, Lind & Ponack

[57] ABSTRACT

A damping device has a liquid vessel into which the liquid is injected having the flattening wave motion water surface formed in such a manner that the wave motion direction of the wave motion water surface is a strecher one, damping members are provided in order to damp the sloshing of liquid in the liquid vessel, and wave dissipation devices are disposed at the portion which isn't always soaked in liquid in the liquid vessel. Accordingly, the vibration in a construction occurring by wind, earthquake and the like is absorbed by means of viscosity resistance occurring between liquid and damping member, and the vibration is restricted. Moreover, damping performance can be efficiently exercised by providing various kinds of installation forms.

1 Claim, 8 Drawing Sheets

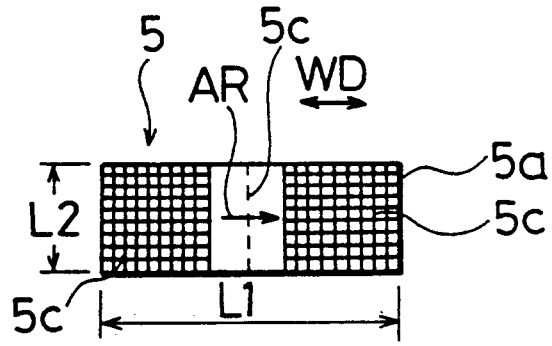
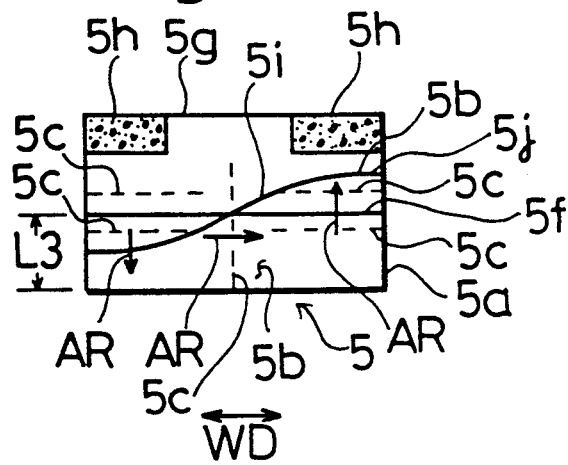
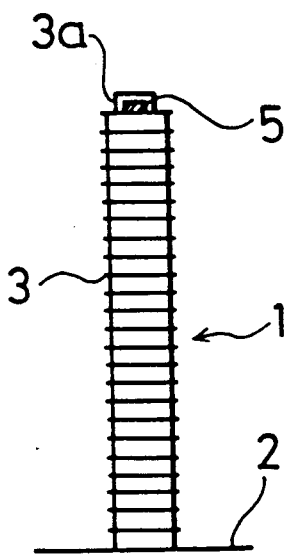
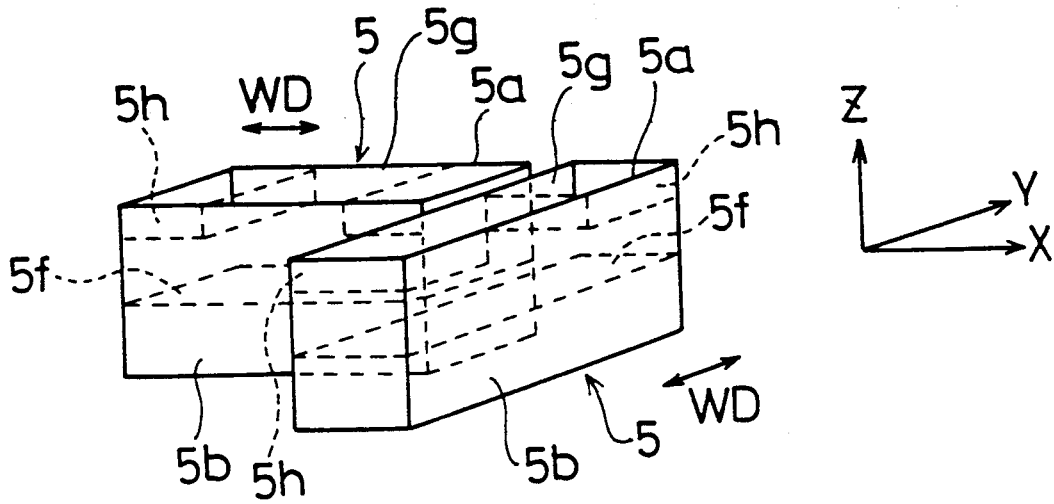

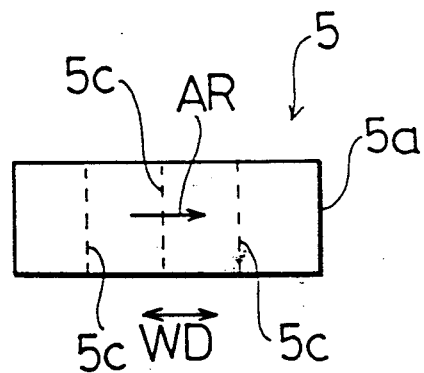
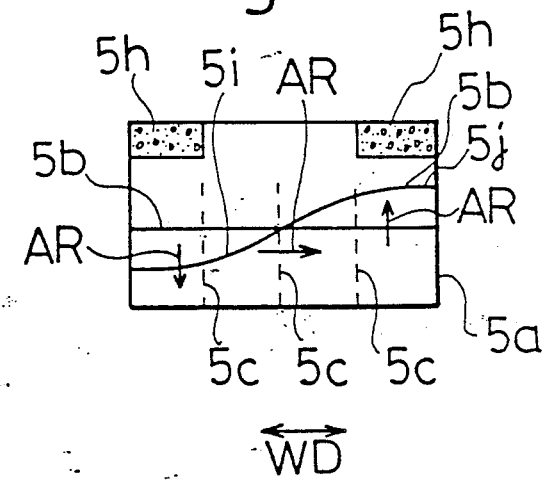
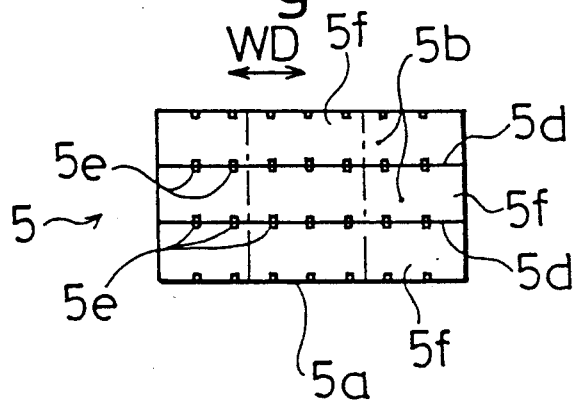
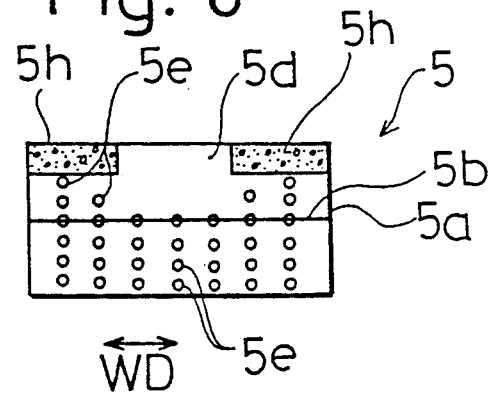
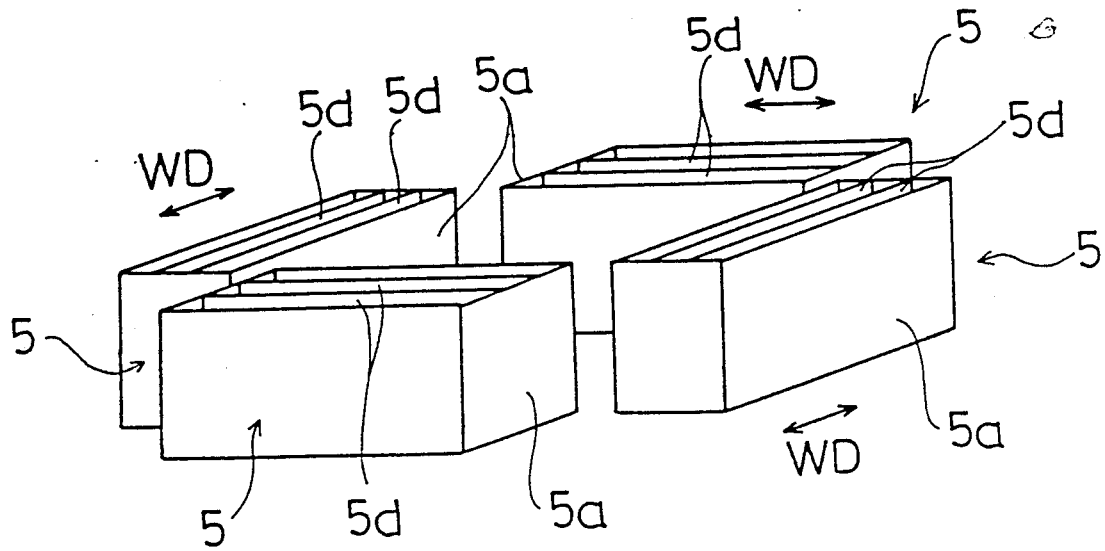

Fig. 12
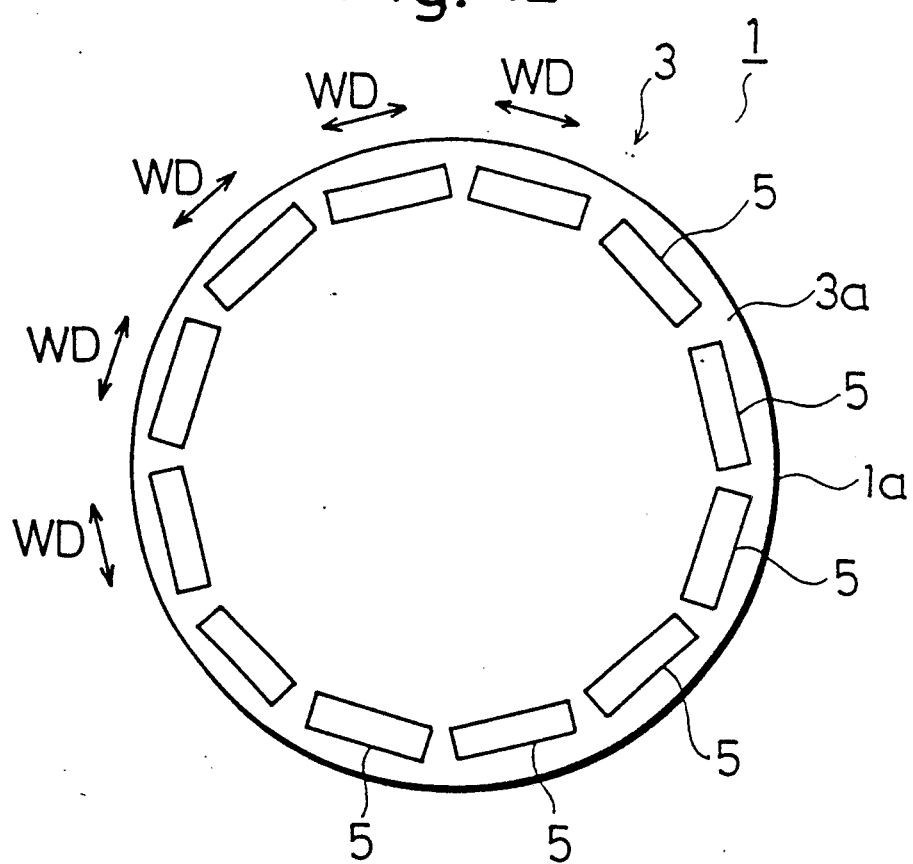
Fig. 13
Fig. 14
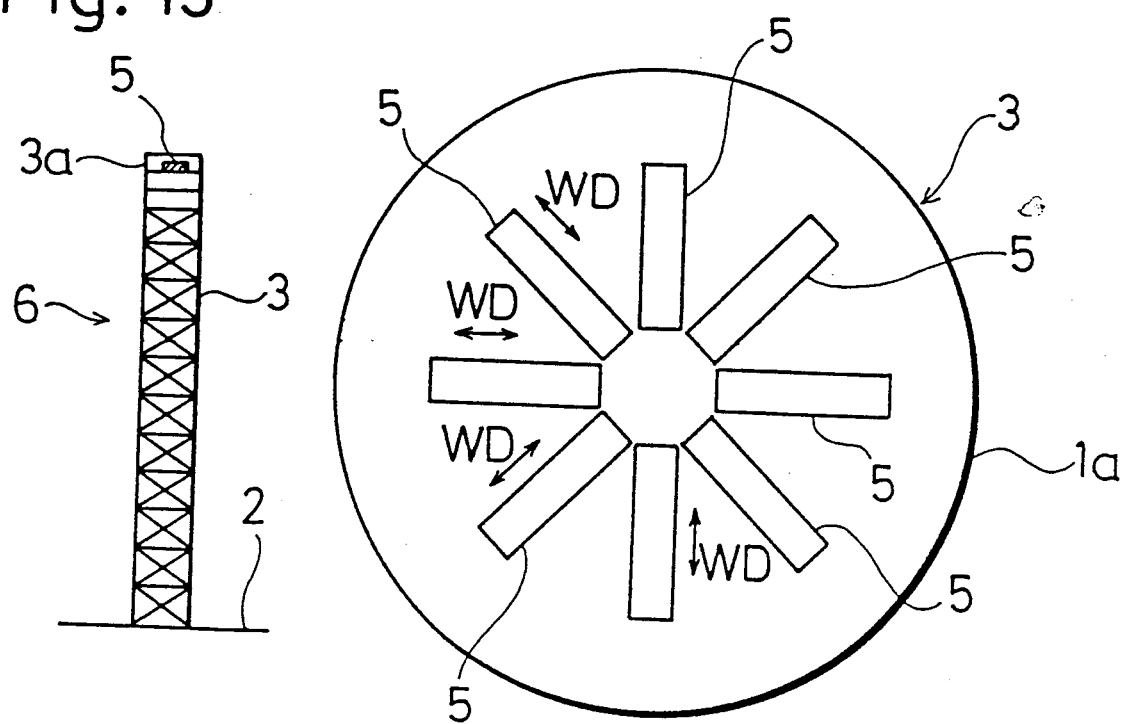

DAMPING DEVICE IN A STRUCTURE AND DAMPING CONSTRUCTION AND DAMPING METHOD USING THOSE DEVICES

This is a Divisional application of Ser. No. 07/216,496, filed on July 8, 1988.

BACKGROUND OF THE INVENTION

The present invention relates to the damping device for preventing the horizontal vibration of a structure which proceeds from wind and earthquake by disposing it on the upper portion of a structure and the damping structure and damping method using those devices.

In U.S. PAT. No. 4,226,554, the following proposal is advanced. It is that the horizontal vibration of a structure which proceeds from earthquake, wind and the like is prevented in such a manner that damping devices comprising liquid vessels into which the liquid having open water surface is injected are disposed on the upper portion of the structure.

However, the founded technique isn't present relating the concrete installation forms and the efficient internal constitution of a damping device and the like, and such a technique is desired.

SUMMARY OF THE INVENTION

It is therefore an object of the present invention to provide a damping device having internal constitution and the installation forms capable of exercising efficient damping performance, and the damping constitution and damping method using those devices so as to solve the above-described defects.

That is, the present invention is comprised of a liquid vessel, into which the liquid is injected, having a flattening wave motion water surface formed in such a manner that the wave motion direction of the wave motion water surface is the stretcher one, damping members such as meshes, partition walls and projections for damping the sloshing of the liquid in the liquid vessel and wave dissipation devices provided at the portion which isn't always soaked in the liquid of the liquid vessel.

According to the present invention, the vibration which proceeds from wind and earthquake in a structure such as a multistory building and tower can be efficiently absorbed by sloshing the liquid in each damping device. And, since its constitution has no mechanical moving part by a liquid vessel, liquid and the like, it has reliability toward the change with the passage of time in comparison with a mechanical damping organization. And, it can be easy to perform inspection and maintenance. If high wave occurs in the liquid of a vessel by operating the sloshing which the amplitude is broad, its energy is efficiently absorbed by means of wave dissipation devices. Therefore, the cycle of liquid has no disorder, and its device is sufficiently reliable.

The damping device is comprised of a liquid vessel, into which the liquid is injected, having the flattening wave motion water surface formed in such a manner that the wave motion direction of the wave motion water surface is a stretcher one, and damping member such as meshes, partition walls and projections for damping the sloshing of the liquid in the liquid vessel. With the above-described constitution, the plural damping devices are disposed in such a manner that the stretcher direction of the liquid vessel of each damping device faces at least two horizontal directions of the structure.

According to this constitution, the vibration in the horizontal direction which proceeds from wind and earthquake in a structure such as a multistory building and tower can be efficiently absorbed relating each direction by the sloshing of the liquid in each damping device.

Furthermore, the damping device is comprised of a liquid vessel, into which the liquid is injected, having the flattening wave motion water surface formed in such a manner that the wave motion direction of the wave motion water surface is a stretcher one, and damping member such as meshes, partition walls and projections for damping the sloshing of the liquid in the liquid vessel. With the above-described constitution, the damping devices are disposed on the upper portion of a structure in such a manner that the damping devices at the side being distant from the center of rigidity of the structure such as side face are more than that of the reverse side.

According to this constitution, in case that the center of rigidity of a structure is shifted from the center of gravity in the horizontal plane, its vibration energy can be absorbed as equal as possible. And, torsional vibration with the center of rigidity as its center can be efficiently absorbed.

Moreover, in an existing structure being provided an elevated water tank on the upper portion such as a multistory building and tower, the constitution is such that resistance member such as meshes, partition walls and projections are provided in the elevated water tank and wave dissipation devices are provided at the upper portion of the elevated water tank. Then, the vibration in an existing structure is restricted by the resistance between the resistance member and water which is stocked in the elevated water tank.

According to this constitution, the damping function toward the vibration by wind and earthquake can be added only by providing resistance member in an elevated water tank which is provided at an existing structure such as a multi-story building and tower. And, since the installation activity of the complicated machinery isn't needed at all, the structural body in the shape of changing the size of the liquid vessel. In this case, the damping device is comprised of the liquid vessel having the liquid injected in the shape of forming open-level.

Then, each position being provided the liquid vessel has no useless space. Therefore, the limited space of a structure can be efficiently utilized.

BRIEF DESCRIPTION OF THE DRAWINGS

FIG. 1 is a view for showing an example of the structure to which this invention is applied;

FIG. 2 is a strabismus view for showing an example of the arrangement of damping devices;

FIG. 3 is a top view for showing an embodiment of a damping device;

FIG. 4 is a front sectional view of the damping device in FIG. 3;

FIG. 5 is a top view for showing the other embodiment of a damping device;

FIG. 6 is a front sectional view of a damping device in FIG. 5;

FIG. 7 is a top view for showing another embodiment of a damping device;

FIG. 8 is a front sectional view of a damping device in FIG. 7;

FIG. 9 is a strabismus view for showing an example of the other arrangement of damping devices;

FIG. 12 is a top view for showing an example of another arrangement of damping devices;

FIG. 13 is a front elevation for showing an other example of the structure using damping devices;

FIG. 14 is a top view for showing an example of the another arrangement of damping devices;

DESCRIPTION OF THE PREFERRED EMBODIMENT

Figure 19:
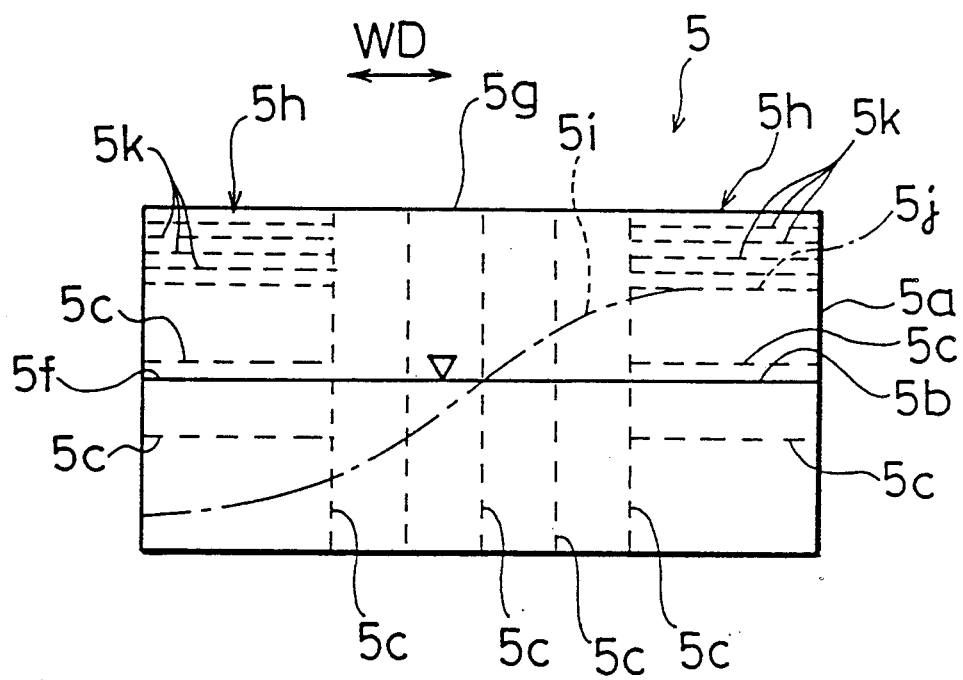
FIG. 19 is a front sectional view for showing another example of a damping device.

The multistory building 1 which is a kind of a structure has a structural body 3 which is built on the ground 2 as shown in FIG. 1, and the plural damping devices 5 are disposed on the apical portion 3a of the structural body 3. Two damping devices 5 are disposed in the shape of crossing rectangularly each other as shown in FIG. 2. Each damping device 5 has a liquid vessel 5a of which a lid member 5g is provided on the upper portion and the form in the flat of the vessel 5a is rectangle as shown in Figs. 3 and 4. The liquid 5b which is water, or liquid having the same viscosity with water or higher viscosity than water is injected into each liquid vessel 5a. Wave motion water surface 5f occurring by sloshing of the corresponding liquid 5b is formed in the shape of rectangle as flattening shape in the liquid vessel 5a by means of the injected liquid 5b as shown in FIG. 2. The meshes 5c comprising stainless steel, vinylon, high efficiency fiber and the like are provided at two deck, upper and lower portions as shown in FIG. 4 as damping member at both sides, right and left in the liquid vessel 5a in FIG. 3. And the mesh 5c is perpendicularly provided at the center portion of FIG. 4. The wave dissipation devices 5h and 5h are provided at both sides of the lid member 5g at the upper portion of the liquid vessel 5a. The wave dissipation device 5h is composed of porous member forming a block by scrap iron, crushed stone, metal chip and the like or the aggregation of meshes provided in the shape of superimposing plural number of meshes 5k in the horizontal direction as shown in FIG. 19.

With the above-described constitution of a multistory building 1, when the structural body 3 vibrates by earthquake, gust and the like, the damping device 5 provided at the apical portion 3a also vibrates. Then, the liquid 5b in the damping device 5 sloshes in the stretcher directions WD of the wave motion water surface 5f in the shape of synchronizing with the vibration of the structural body 3 as shown in FIGS. 3 and 4. That is, the liquid 5b easily starts sloshing according to the vibration of a multistory building 1 by harmonizing the sloshing cycle of the liquid 5b (The sloshing cycle of the liquid 5b is decided by the length L1 in the long side direction of the liquid vessel 5a and the height of liquid L3 of liquid 5b in a stationary condition as shown in FIGS. 3 and 4.) with the primary natural vibration cycle of the multistory building 1, and the vibration energy of the multistory building 1 is absorbed by its wave motion. When the liquid 5b sloshes, the liquid 5b passes the meshes 5c provided in the liquid vessel 5a in the up and down directions in FIG. 4 as shown by the arrows AR by the sloshing. At the time, viscosity resistance acting between the liquid 5b and the meshes 5c acts on the direction in which the movement of the liquid 5b is restrained. Accordingly, the sloshing of the liquid 5b is damped, and absorbing power of the vibration energy is improved.

When the vibration of the structural body 3 becomes over the predetermined value, the height of wave of the liquid 5b in the damping device 5 also becomes higher. Then, the apical portion 5j of the wave 5i reaches at the lid member 5g as shown in FIG. 4. However, when the apical portion 5j of the wave directly collides the lid member 5g and bounds, the cycle of the liquid 5b is disturbed, and it becomes to be impossible to exercise the proper damping effect. But, the wave dissipation devices 5h and 5h are disposed at both sides in the direction of the wave motion where the apical portion 5j of the wave 5i is produced in the liquid vessel 5a, the wave 5i flows into the many porosity of the porous member of the wave dissipation device 5h in the shape of dissipating in such a manner that the wave 5i collides the wave dissipation device 5h, and its energy is efficiently absorbed. Therefore, the wave by means of bounce by which wave motion cycle in the vessel is confused dosen't occur. Furthermore, the wave dissipation device 5h can prevent wave from colliding the lid member 5g directly. Therefore, the exceeding pressure don't occur in the lid member 5g by the wave, and the reduction of the lid member 5g can be prevented. Accordingly, the absorbing operation of the vibration by the damping device 5 is smoothly performed.

Figure 16:
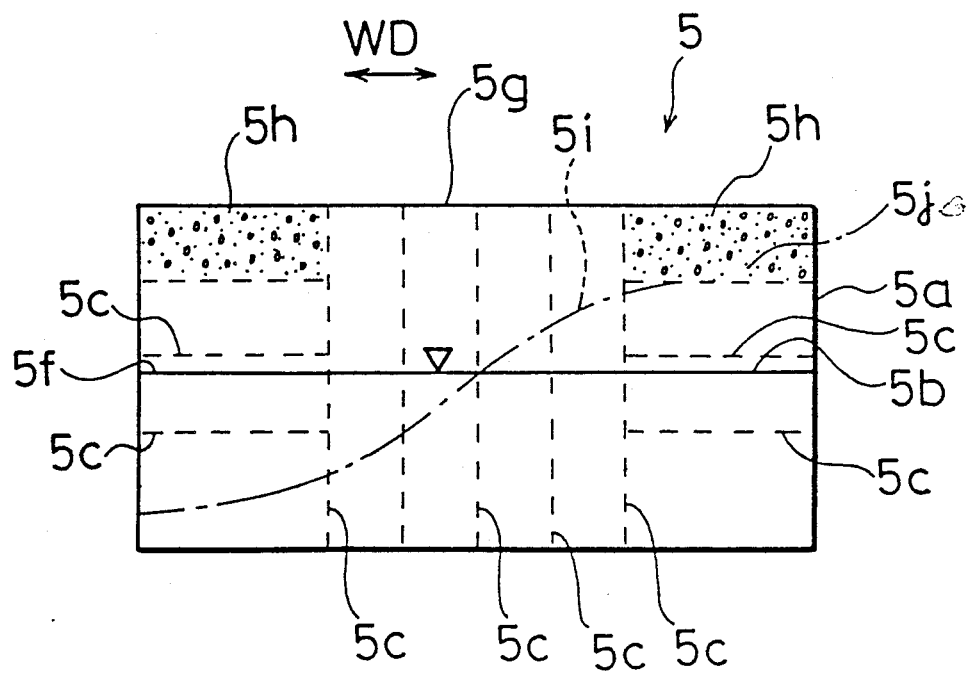
FIG. 16 is a front sectional view for showing another example of a damping device.

The above-described embodiment has mentioned the case using the meshes 5c as a damping member provided in the liquid vessel 5a. But, any configuration, form, and installation mode of the damping member are available as long as the damping member can damp the sloshing of the liquid 5b in the liquid vessel 5a. For example, it may be available that plural meshes 5c are provided in such a manner that the liquid vessel 5a is divided in the vertical direction in FIG. 6, as shown in FIGS. 5 and 6. Furthermore, it is possible that the meshes 5c are provided in the shape of mating the vertical direction with the horizontal direction of the liquid vessel 5a as shown in FIGS. 16 and 19. In case that the meshes 5c are provided at both sides of the liquid vessel 5a at level, the height of the wave 5i of the liquid 5b can be restricted by the meshes 5c provided at level. Therefore, the damping efficiency can be exercised toward earthquake occurring the bigger vibration and the like.

And, besides members 5c, partition walls 5d are provided in the shape of partitioning in the direction of the wave motion of the liquid 5b in the liquid vessel 5a, that is, in the right and the left direction in the figure as shown in FIGS. 7 and 8 (The water surface of the wave motion 5*f* is divided into the plural number.). Moreover, many projections 5*e* are disposed at the partition walls 5*d* in the shape of fitting sloshing forms of the liquid 5*b* (namely, for example, in the shape of denting the center portion as shown in FIG. 8). Then, the vibration of the liquid 5*b* is damped by the viscosity resistance occurring between the projections 5*e* and the liquid 5*b*. The above-described method is naturally available. Moreover, a chip of steel, plastic moulding goods and the like can be disposed in the liquid vessel 5*a* as a damping member.

Figure 10:
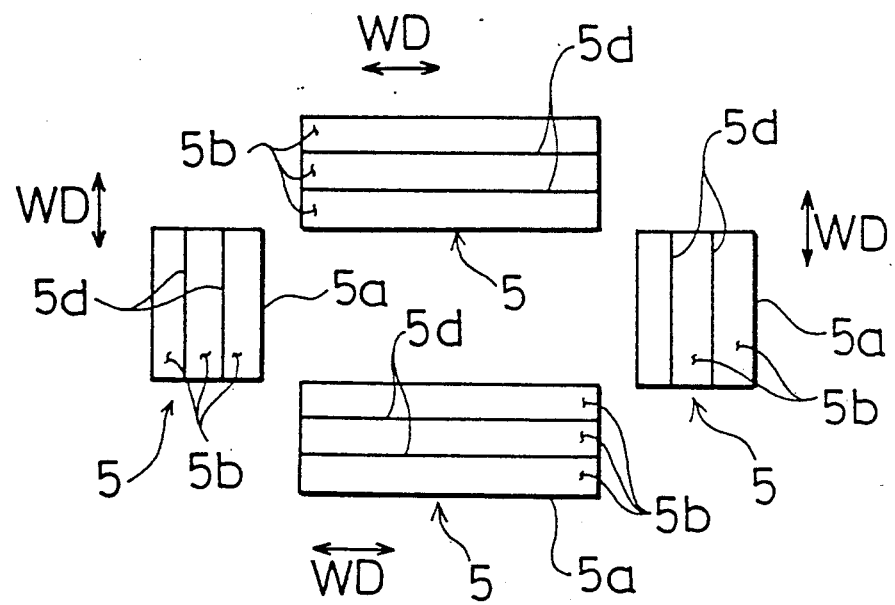
FIG. 10 is a top view of FIG. 9.
Figure 11:
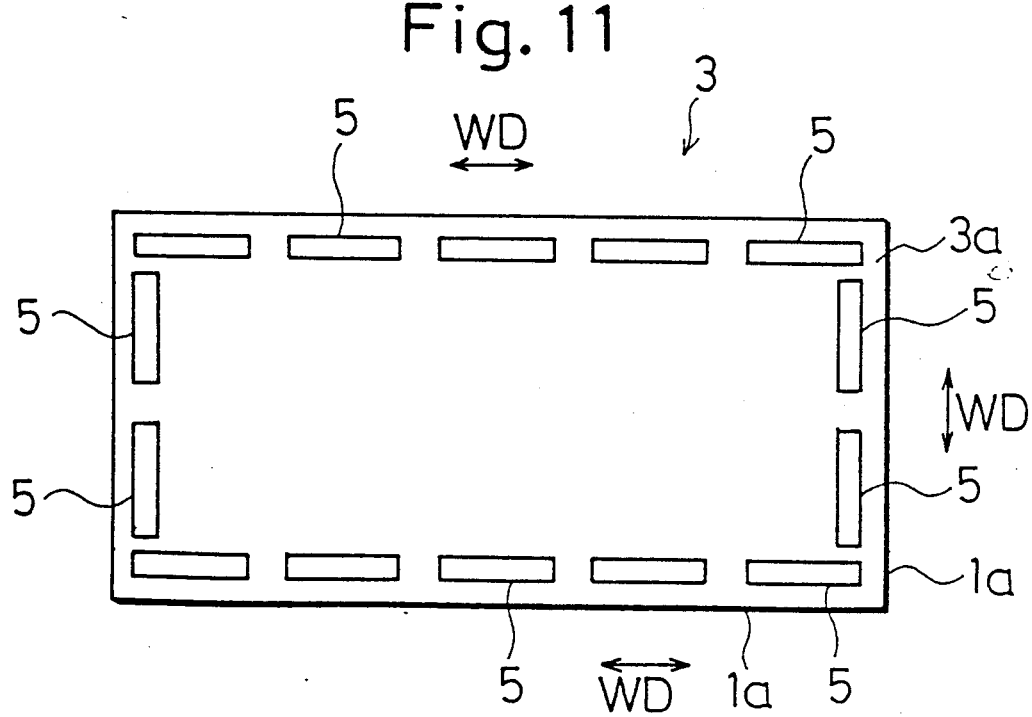
FIG. 11 is a top view for showing an example of another arrangement of damping devices.
Figure 15:
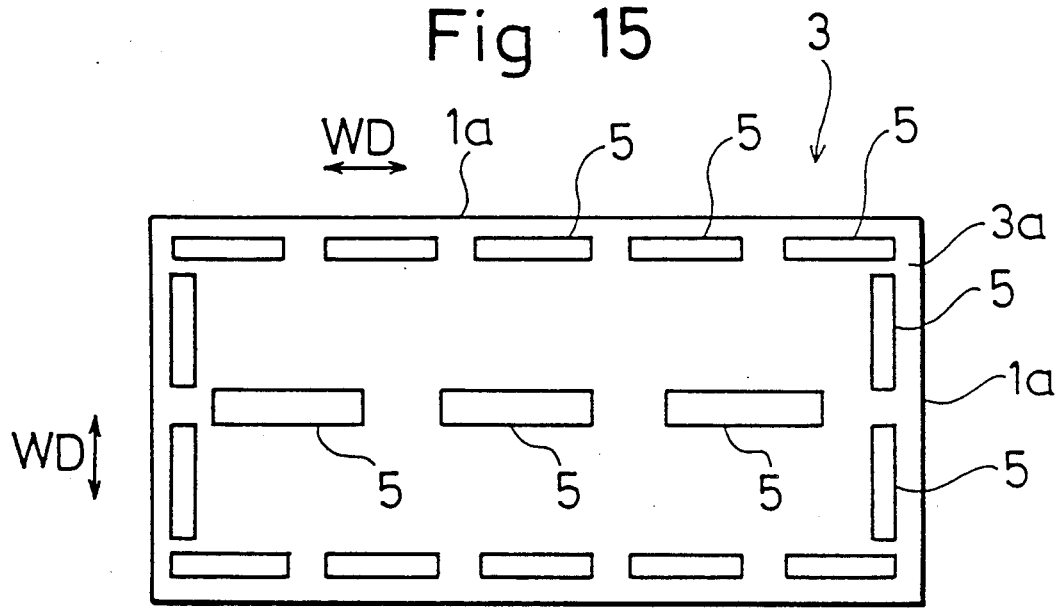
FIG. 15 is a top view for showing an example of another arrangement of damping devices.

The arrangement forms of the damping devices 5 can be properly selected according to the arrangement place and the necessary damping effect. Since the wave motion of the liquid 5*b* occurs in the stretcher direction of each damping device 5, the damping devices 5 are disposed in such a manner that the stretcher directions WD of the water surface of the wave motion 5*f* of each damping device 5 are faced to at least two directions of the structure 1 to be absorbed the vibration. Then, the vibration acts on each damping device 5 in the shape of resolving into two directions at least, and high damping effect can be exercised. For example, as shown in FIGS. 9 and 10, plural damping devices 5 can be arranged so that the stretcher directions WD in which the water surface of the wave motion 5*f* forms the wave motion face two horizontal directions being orthogonal each other. Accordingly, the vibration in two orthogonal directions occurring at the structure 1 can be effectively absorbed. Moreover, as the arrangement form of the damping devices 5, many damping devices 5 can be arranged along the external wall 1*a* of the structure 1 as shown in FIGS. 11 and 15. (In case of FIG. 15, the damping devices are also disposed at the center of the structure 1.) In such a case, if there is an existing equipment such as a machine room of an elevator at the apical portion 3*a* of the structure 1, the damping devices 5 can be disposed by avoiding such an existing equipment, and the construction space can be effectively utilized. In case that the plane form is circular structure 1, many damping devices may be disposed along the external wall 1*a* of the circle as shown in FIG. 12. And, it can be off course that the damping devices 5 are disposed radially as shown in FIG. 14. Furthermore, the damping effect can be substantially improved by arranging the damping devices along the external wall 1*a* of a structure 1 at which vibration amplitude becomes bigger.

In case that the position of the center of gravity W of the structural body 3 is shifted from the position of the center of rigidity G (In case of FIG. 17, the position of the center of gravity W locates the center in up and down directions and in right and left directions in the structural body 3 in the figure, and the position of the center of rigidity G locates the center in up and down directions and the right hand to some extent in the figure in comparison with the center of gravity W.), the structural body 3 generates torsional vibration with the center of rigidity G as its center in the directions as shown by the arrows A and B. Then, the farther the distance from the center of the rigidity G is, the bigger the amplitude of the structural body 3 becomes. In case of FIG. 17, the amplitude of the side face 3*b* of the left hand in the figure becomes bigger than that of the side face 3*c* of the right hand. Then, since the vibration energy of the side face 3*b* becomes bigger than that of the side face 3*c*, it is necessary that the vibration absorbing ability of the side face 3*b* side is bigger than that of the side face 3*c* side in order to absorb the vibration properly. When the number of the damping devices 5 being disposed at the side face 3*b* having the distance L4 from the center of rigidity G is more than that being disposed at the side face 3*c* having the distance L3, the absorbing quantity of the vibration energy of the side face 3*b* side increases. In result, the vibration in the directions as shown by the arrows A and B of the structural body 3 is smoothly and thoroughly absorbed relating to both sides, the right and the left of the center of rigidity G.

Figure 18:
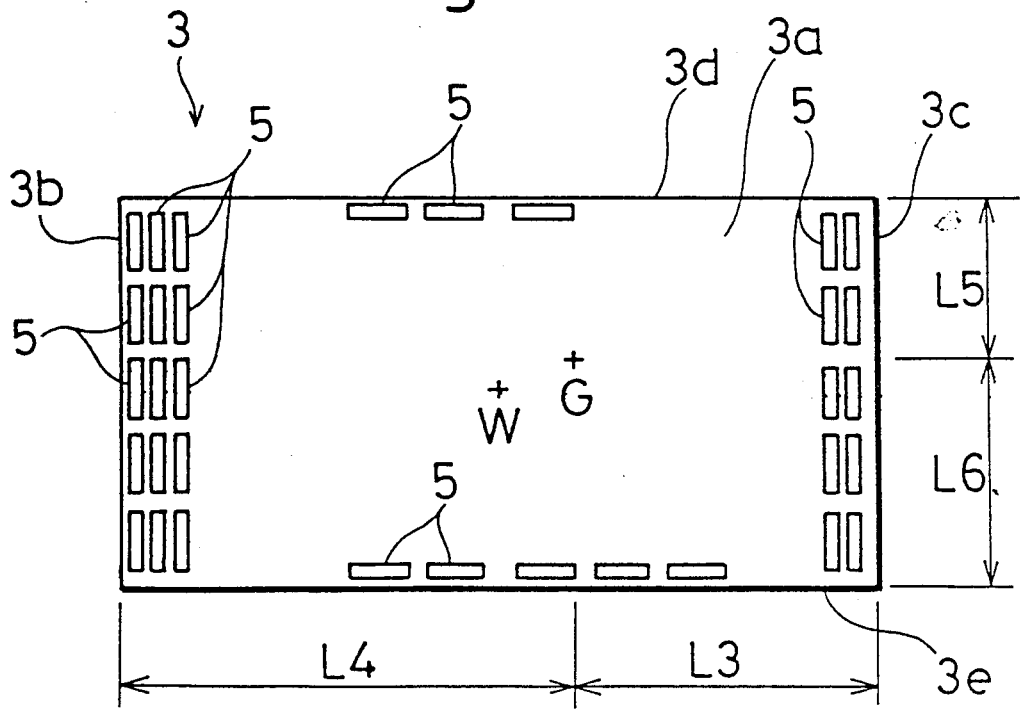
FIG. 18 is a top view for showing the other example of the arrangement construction of damping devices.

In case that the position of the center of rigidity G is shifted in up and down directions of the structural body 3 as well as in right and left directions as shown in FIG. 18 (In case of FIG. 18, the position of the center of gravity W locates the center in up and down directions and in right and left directions of the structural body 3 in the figure. The position of the center of rigidity G locates the upper portion in the figure to some extent and the right hand than the center of gravity W.), the amplitude of the side face 3*b* having the distance L4 from the center of rigidity G and the amplitude of the side face 3*e* having the distance L6 from the center of rigidity G become big. Accordingly, the number of the damping devices 5 to be disposed on the side faces 3*b* and 3*e* side are more than that on the side faces 3*c* and 3*d* side which have the distances L3 and L5 from the center of rigidity G respectively. Therefore, the vibration absorbing ability of the side faces 3*b* and 3*e* side are increased, and the vibration of the structural body 3 is smoothly absorbed without unbalance.

The structure having comparatively long vibration cycle in the flexible structure is suitable for the structure to which the damping devices 5 according to the present invention are applied. It is off course that the tower 6 comprising steel frame and the like as shown in FIG. 13 can be applied as well as the multistory building 1 as shown in FIG. 1.

The damping effect is exercised in such a manner that concerning the quantity of the liquid 5*b* in the liquid vessel 5*a*, the weight of free water which depends on splash is 0.5-2% of the weight of a structure (The much the weight of free water is, the higher the damping effect is.), and the damping constant by means of the damping member is about 2-10%.

The above-described embodiment mentioned with regard to the case that wave dissipation devices 5*h* are disposed at both sides in the wave motion directions WD of the liquid vessel 5*a*. However, wave dissipation devices 5*h* aren't always disposed at the both sides of the liquid vessel 5*a*. Any place is available regarding installation place of wave dissipation devices as long as they aren't always soaked in the liquid 5*b*. It is off course that they can be disposed at all faces of the upper portion or all faces of the sidewall of the liquid vessel 5*a*.

Figure 17:
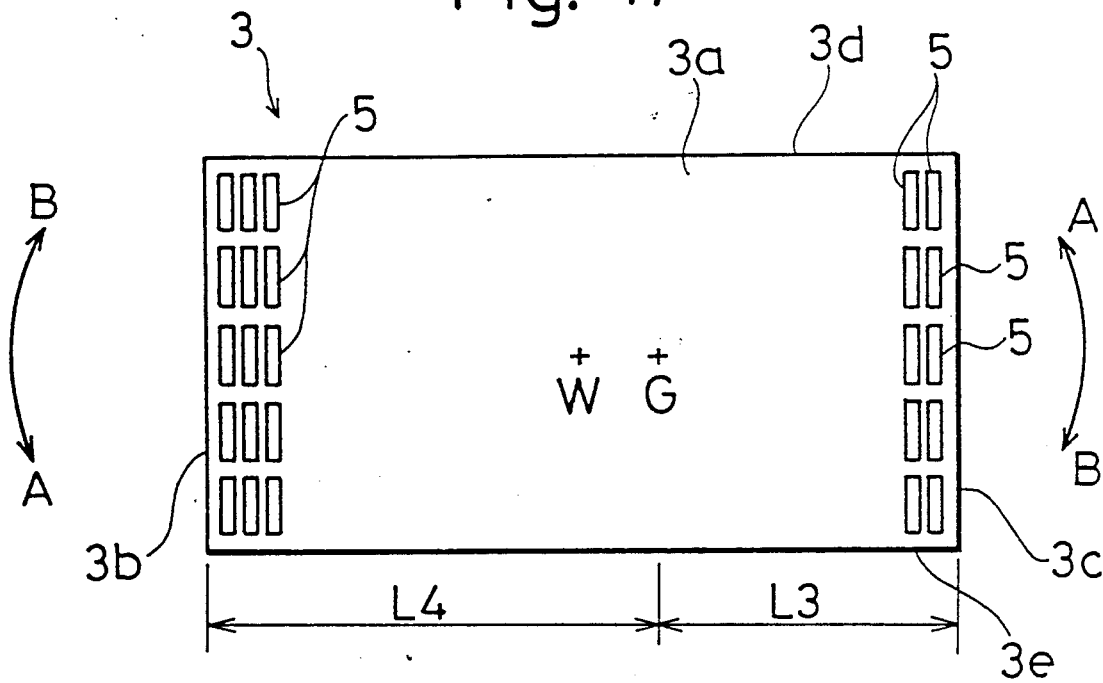
FIG. 17 is a top view for showing an example of the arrangement construction of damping devices.

Furthermore, the plane form of the structure 1 isn't always square form as shown in FIGS. 17 and 18. It is off course that any form, for instance polygon and orbicularity is available.

The damping devices according to the present invention can be disposed at both structures, a new structure and an existing structure. For instance, the damping devices by disposing the damping member such as meshes in an elevated water tank which is equipped at the upper portion of the existent structure are off course available.

Figures 20, 21, 22:
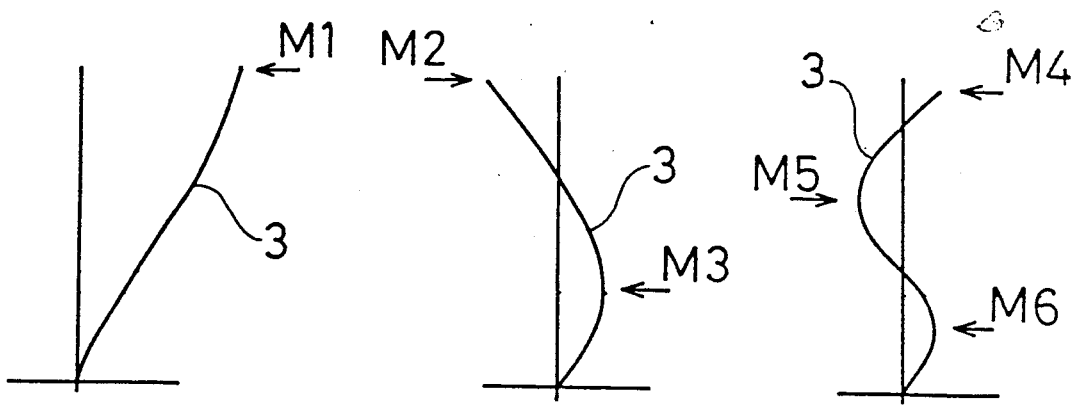
FIGS. 20 through 22 are views for showing some kinds of vibration modes of a structure.

In the modes of vibration which occurs on the structural body 3, there are the higher-level modes such as the secondary and the tertiary as well as the primary vibration mode. Those vibration forms are as follows; In the primary mode, the maximum amplitude portion M1 exists at the upper edge of the structural body 3 as shown in FIG. 20 (In FIGS. 20 through 22, the structural body 3 is indicated by a line in order to understand the explanation easily.). However, the secondary vibration mode is substantially different from the primary one in a mode as shown in FIG. 21, and the maximum amplitude portions M2 and M3 occur not only at the upper edge of the structural body 3 but also at the down portion to some extent in comparison with the center portion. Moreover, in the tertiary vibration mode, as shown in FIG. 22, the maximum amplitude portions M4, M5 and M6 occur at the upper edge of the structural body 3, the upper portion in comparison with the center and the down portion in comparison with the center respectively.

Accordingly, to install the damping devices 5 only on the upper portion of the structural body 3 is available for the primary vibration mode, but it is thinkable that this lacks effectiveness for the secondary vibration or the higher-level vibration than the secondary.

Figure 23:
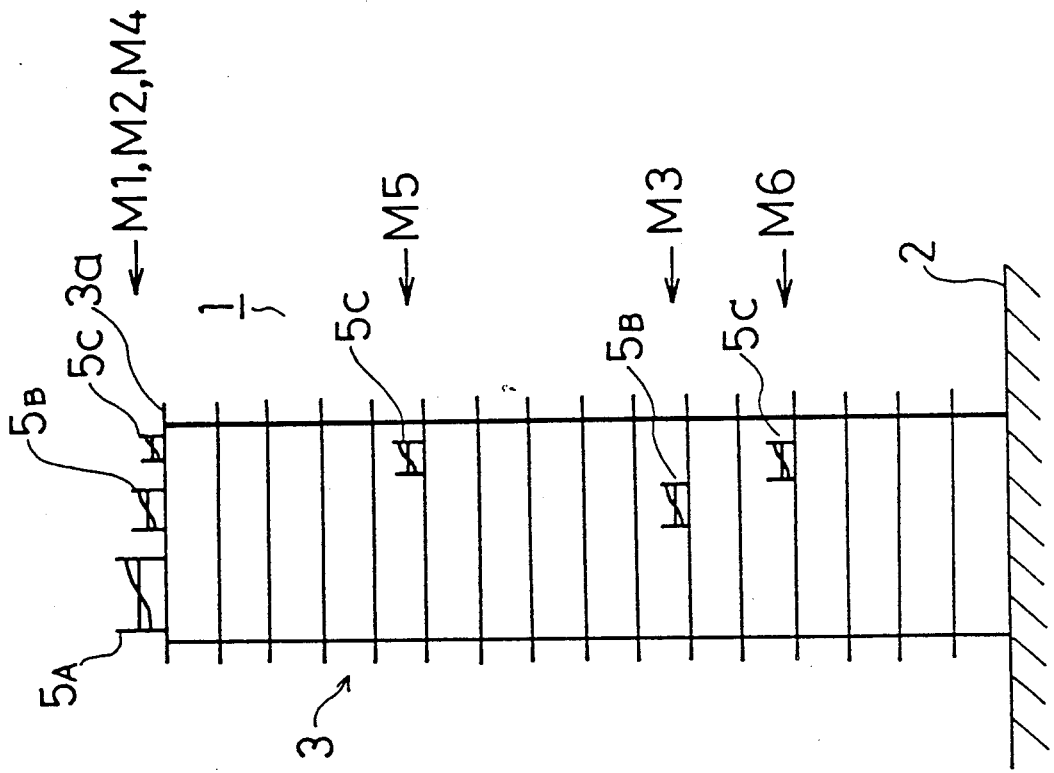
FIG. 23 is a front elevation for showing an embodiment of a damping structure.

Therefore, as shown in FIG. 23, the damping devices $5_A$ in which the liquid 5b is stored are disposed at the upper portion of the structural body 3, that is, at the maximum amplitude portion M1 in the primary natural vibration of the structural body 3. In this case, the liquid 5b has the sloshing cycle corresponding to the primary natural frequency of the structural body 3 (Ordinarily, it corresponds with the primary natural frequency.). Moreover, the damping devices $5_B$ in which the liquid 5b is stored are disposed at the maximum amplitude portions M2 and M3 in the secondary natural vibration of the structural body 3. In this case, the liquid 5b has the sloshing cycle corresponding to the secondary natural frequency of the structural body 3 (Ordinarily, it corresponds with the secondary natural frequency.). The shorter the sloshing cycle of the storing liquid 5b is, that is, the higher the frequency is, the smaller the liquid vessel 5a comprising the damping devices 5 is.

Figure 24:
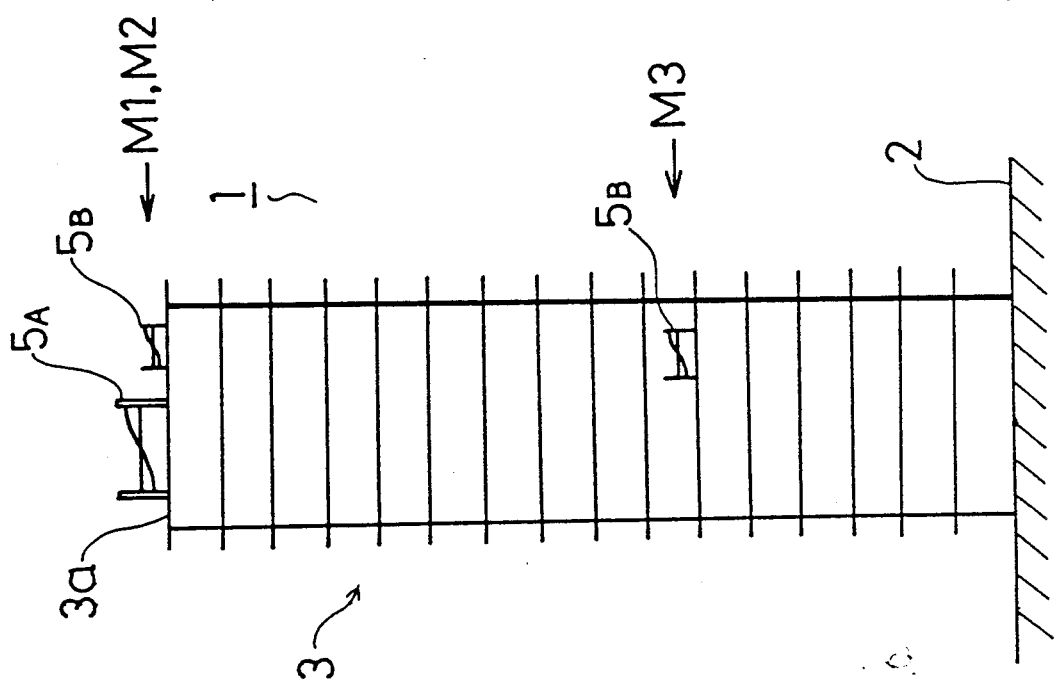
FIG. 24 is a front elevation for showing another embodiment of a damping structure.

By taking the above-described measures, in the structural body 3 as shown in FIG. 23, the primary vibration is efficiently absorbed by means of the damping devices $5_A$ and the secondary vibration is efficiently absorbed by means of the damping devices $5_B$ in case of earthquake and the like. Furthermore, in order to improve damping efficiency, the damping devices $5_C$ in which the liquid 5b is stored are disposed at the maximum amplitude portions M4, M5 and M6 in the tertiary natural vibration as shown in FIG. 24 as well as damping actions toward the primary and the secondary vibration by means of the damping devices $5_A$ and $5_B$ as shown in FIG. 23. In this case, the liquid 5b of the damping devices 5c has the sloshing cycle corresponding to the tertiary natural frequency of the structural body 3 (Ordinarily, it corresponds with the tertiary natural frequency.). Then, the damping efficiency of the structural body 3 is expanded to the tertiary natural vibration portion.

Heretofore, the present invention was explained on the basis of the embodiments. But, the embodiments which are mentioned in the present specification are nothing but instances. And, the embodiments aren't restricted. The scope of the invention is designated by the claims accompanied with the specification and isn't restricted to the mentions of the embodiments. Therefore, all the deformation and the change belonging to the claims are included in the scope of the present invention.

I claim:

1. A damping device for absorbing vibrations of a structure said damping device comprising:
    an elongated vessel for containing a liquid therein such that movement of the vessel will create a wave motion of the liquid surface in the elongated direction of said vessel;
    a plurality of damping members disposed inside said vessel for damping the sloshing of the liquid inside said vessel, said plurality of damping members comprising a plurality of meshes, including one said mesh vertically disposed in a central portion of said vessel and horizontal said meshes disposed at end portions of said vessel; and
    wave dissipation means for dissipating the wave motion of the liquid in said vessel.

* * * * *